United States Patent [19]

Anderson

[11] 4,308,248

[45] * Dec. 29, 1981

[54] MATERIAL AND METHOD TO DISSOCIATE WATER

[75] Inventor: Eugene R. Anderson, Wills Point, Tex.

[73] Assignee: Horizon Manufacturing Corporation, Wills Point, Tex.

[ * ] Notice: The portion of the term of this patent subsequent to Jan. 8, 1997, has been disclaimed.

[21] Appl. No.: 110,410

[22] Filed: Jan. 8, 1980

Related U.S. Application Data

[63] Continuation-in-part of Ser. No. 902,705, May 4, 1978, Pat. No. 4,207,095, Ser. No. 902,708, May 4, 1978, Pat. No. 4,182,748, Ser. No. 68,749, Aug. 23, 1979, and Ser. No. 85,374, Oct. 16, 1979.

[51] Int. Cl.³ .................... C01B 1/07; C01B 13/02
[52] U.S. Cl. ........................ 423/579; 75/134 N; 423/657
[58] Field of Search ........... 423/579, 657, 648 R; 75/134 N, 134 A, 138, 169, 134 F, 134 R, 172 R

[56] References Cited

U.S. PATENT DOCUMENTS

| | | | |
|---|---|---|---|
| 909,536 | 1/1909 | Brindley | 423/657 |
| 934,036 | 9/1909 | Brindley | 423/657 |
| 3,786,139 | 1/1974 | MacKenzie et al. | 423/657 |
| 3,985,866 | 10/1976 | Oda et al. | 423/657 |
| 4,182,748 | 1/1980 | Anderson | 423/579 |

FOREIGN PATENT DOCUMENTS 3188 2/1909 United Kingdom ............... 423/657

Primary Examiner—Edward J. Meros

[57] ABSTRACT

A material and method to decompose/dissociate water into hydrogen and oxygen. The material comprises a reactive alloy of an alkali metal and aluminum combined with a catalytically effective amount of an alloy comprising a metal selected from the platinum metal family and at least one metal selected from the group consisting of germanium, antimony, gallium, thallium, indium and bismuth.

27 Claims, No Drawings

MATERIAL AND METHOD TO DISSOCIATE WATER

CROSS-REFERENCE TO RELATED APPLICATIONS

This application is a continuation-in-part of application Ser. No. 902,705, entitled MATERIAL AND METHOD FOR OBTAINING HYDROGEN DISSOCIATION OF WATER, filed on May 4, 1978 and now U.S. Pat. No. 4,207,095; of application Ser. No. 902,708, entitled MATERIAL AND METHOD FOR OBTAINING HYDROGEN AND OXYGEN BY DISSOCIATION OF WATER, filed on May 4, 1978 and now U.S. Pat. No. 4,182,748; of application Ser. No. 06/068,749, entitled MATERIAL AND METHOD FOR OBTAINING HYDROGEN BY DISSOCIATIONS OF WATER, filed on Aug. 23, 1979; and of an application having application Ser. No. 06/085,374, entitled MATERIAL AND METHOD TO DISSOCIATE WATER AT CONTROLLED RATES, filed on Oct. 16, 1979; and is related to an application having application Ser. No. 06/085,373, entitled HYDROGEN GENERATING APPARATUS AND METHOD, filed on Oct. 16, 1979; and to application Ser. No. 06/056,994, entitled FUEL SYSTEM AND METHOD, filed on July 12, 1979.

BACKGROUND OF THE INVENTION

1. Field of Invention

This invention relates to a material for and a method of effecting the decomposition/dissociation of water into hydrogen and oxygen.

The water is reacted with a reactive alloy of sodium and aluminum to form hydrogen and a metallic hydroxide denoted by the formula $Na_3Al(OH)_6$. The $Na_3Al(CH)_6$ is unstable at the temperature of formation in the presence of a catalyst comprising a platinum group metal or nickel and at least one element selected from the group consisting of germanium, antimony, gallium, thallium, indium and bismuth and breaks down to form metallic sodium and aluminum thereby releasing oxygen and hydrogen.

2. Description of the Prior Art

It is well known in the prior art that alkali metals react with water to form hydrogen and the stable alkali metal hydroxide. The foregoing reaction is rapid, the heat generated intense and explosion of the alkali metal and hydrogen usually occurs. The result is an unsatisfactory and dangerous method of generating hydrogen. It is also well known that metal peroxides may be used for the generation of oxygen (see U.S. Pat. No. 3,574,561).

Thermomechanical cycles comprising metal-metaloid combinations for the generation of both hydrogen and oxygen are disclosed in U.S. Pat. No. 3,969,495.

Closed cycle processes for dissociation of water into hydrogen and oxygen are disclosed in U.S. Pat. Nos. 3,821,358, 3,928,549 and 4,011,305. Combinations of various metals in multistep processes for dissociation of water are, therefore, well known; however, the simple and facile manner of producing hydrogen and oxygen utilizing a reactive alloy of alkali metal and aluminum combined with a catalytic alloy comprising a platinum group metal or nickel and at least one element selected from the group consisting of germanium, antimony, gallium, thallium, indium, and bismuth has not heretofore been appreciated.

DESCRIPTION OF THE INVENTION

The material I have found to be suitable for the generation of hydrogen and oxygen from water without spontaneous combustion of the resultant evolved hydrogen and oxygen gases comprise a reactive alloy of (1) an alkali metal such as lithium, sodium, potassium, cesium, or combinations thereof, and (2) aluminum combined with a catalytic alloy comprising a platinum group metal or nickel and at least one element selected from the group consisting of germanium, antimony, gallium, thallium, indium and bismuth.

The melting point of sodium and aluminum is such as to enable the formation of a liquid solution of sodium and aluminum when the two are intermixed in a liquid state above their respective melting points.

The atomic weight ratio of alkali metal to aluminum is from about 1:100 to about 100:1. Preferably the atomic weight ratio of alkali metal to aluminum is from about 1:3 to about 3:1.

The reactive alloy of alkali metal and aluminum is combined with a catalytically active alloy which is present in a catalytically effective amount and, at the conditions of hydrogen generation, functions to regenerate the reactive alloy to the reactive alloy state.

It is essential that the catalyst/alloy contain a platinum group metal or nickel and at least one element selected from the group consisting of germanium, antimony, gallium, thallium, indium, and bismuth.

Preferably the catalyst comprises platinum and at least one element selected from the group consisting of germanium, antimony, gallium, thallium, indium and bismuth.

Catalytic activity is further enhanced by the addition of minor amounts of zirconium and chromium.

Silver, tin and/or gold may be incorporated in the catalyst as an alloying element to lower the melting point of the alloy.

The catalytic alloy and the reactive alloy may be compounded with an extender. The extender functions both to dilute the reactive alloy-catalytic alloy combination and to provide a heat conducting medium to dissipate the heat generated during the dissociation of water by contact with the combined reactive alloy and catalytic alloy away from the reaction zone. The extender is preferably tin although other metals which do not readily oxidize in the presence of heat or water and are nonreactive with water may also function as extenders.

The combination of reactive alloy and catalytic alloy, or reactive alloy, catalytic alloy and extender is most suitable in a solid block form, regardless of size, hereinafter referred to as a reactor block.

Although not wishing to be bound by the following explanation, it is believed that the water reacts with the alkali metal, e.g., sodium, and the aluminum liberating hydrogen and forming $Na_3Al(OH)_6$. The $Na_3Al(OH)_6$ is unstable in the presence of the catalytic alloy at the conditions of $Na_3Al(OH)_6$ formation, and the foregoing decomposes to release the $H_2$, $O_2$ and regenerated reactive alloy. The catalytic alloy apparently functions to catalyze the decomposition, and thereby extends the life of the reactive alloy. The process may be depicted as follows:

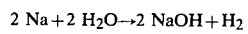

$2\,Na + 2\,H_2O \rightarrow 2\,NaOH + H_2$

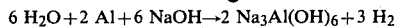

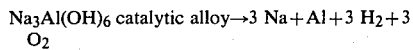

It is preferred to include chromium as an additional component of the catalytic alloy. The incorporation of chromium as a component of the catalytic alloy appears to lower the heat of reaction. The chromium is generally present in the alloy in an amount measured on a weight percent basis of said catalytic alloy of from about 0.7% to about 1.1% and preferably from about 0.8% to about 0.9%.

Each of the components of the catalytic alloy may be present in amounts of from about 0.4% by weight to about 28.5% by weight based on the weight of the combined catalytic alloy and reactive alloy.

The preferred catalytic alloy, provided no extender is used, comprises (1) a platinum group metal or nickel present in amounts of from about 0.7 to about 1.1% by weight, (2) antimony present in an amount of from about 25.5 to about 42.5% by weight, (3) tin present in an amount of from about 42.9 to about 71.5% by weight, (4) chromium present in an amount of from about 0.7 to about 1.1% by weight, (5) zirconium present in an amount of from about 4.1 to about 6.8% by weight and gold present in an amount of from about 1.1 to about 1.9% by weight.

A specific example of said preferred catalytic alloy comprises about 0.9 wt. % platinum, about 34.0 wt. % antimony, about 57.3 wt. % tin, about 0.9 wt. % chromium, about 5.4 wt. % zirconium and about 1.5 wt. % gold.

The reactive alloy of sodium and aluminum is prepared by volumetric blending in the molten state of the two metals with the proviso that both metals must be free of oxides and/or hydroxides prior to blending and that they must be kept in an inert atmosphere after blending and at all times prior to and during mixing with the catalytic alloy.

The resulting reactive alloy may be maintained in the molten state and in an inert atmosphere if it is to be blended with the catalytic alloy immediately. It may be cooled for further blending at a later time provided it is maintained in an atmosphere free of any moisture, oxygen and or nitrogen.

As in the preparation of the reactive alloy and all other steps in the method of manufacture of the various compositions of this invention, precautions must be taken during preparation to avoid the presence of oxygen, nitrogen and/or water inasmuch as these materials coming in contact with the materials before final heat stabilization tend to act as a poison to the resultant material.

The preparation of the selected catalytic alloy may be in any well known manner having in mind the proviso that an inert atmosphere be maintained whether in the molten state or as a cooled solid.

The catalytic alloy when used in the molten liquid state may be combined on a volumetric basis at the elevated temperatures required to maintain a liquid state and after said volumetric blending in the proportions required may be cooled into a solid block or in small granules utilizing any well known manner of granulating with the proviso that the material be maintained in an inert atmosphere until it has cooled after final blending.

The specific manner of catalysis is not known, but generally catalysis is a surface phenomenon and consistant therewith in the instant invention it appears that the catalysis is related to both particle size and nature as well as uniformity of mixture of the reactive alloy and the catalytic alloy.

The reactive alloy and catalytic alloy may be used (1) in particulate form such as a floating bed, or other intimate dispersion, (2) in the form of a porous mass which may be formed by compression or sintering, or (3) as a solid mass by alloying of the reactive alloy and the catalytic alloy. By alloying, it is meant that the reactive alloy and the catalytic alloy are combined to for an admixture or metal solution and alloyed under inert conditions at a temperature above the melting point of said admixture.

In either of the foregoing forms an extender, such as gallium, silver, titanium, magnesium, molybdenum, tungsten, nickel, rhodium, iron, palladium, cobalt, chromium, tin, iridium, lead, vanadium, gold and zirconium may be used. The extender functions to vary activity by controlling the conductance of heat away from the reaction zone on water contact. The higher the temperature of the reaction zone on water contact the more rapid the catalysis of the unstable sodium-aluminum-hydroxide to the reactive metal and hydrogen and oxygen gases.

Admixture of the extender with the reactive alloy and the catalytic alloy is effected by utilizing the extender in the molten state and blending on a volumetric basis with the molten alloys.

EXAMPLE I

PREPARATION OF REACTIVE ALLOY

A reactive alloy comprising 35.144 parts by weight of sodium and 13.749 parts by weight of aluminum is combined volumetrically at a temperature above the melting temperature of the highest melting point element in an inert atmosphere and in the state of agitation at the volumetric blending point.

The resulting reactive alloy is maintained in the molten state and its temperature is increased to a temperature above the melting temperature of the catalytic alloy for volumetric blending with the catalytic alloy and the extender if utilized.

PREPARATION OF CATALYTIC ALLOY 0.3 parts by weight platinum, 11.3 parts by weight antimony, 19.0 parts by weight bismuth, 1.8 parts by weight zirconium, 0.3 parts by weight chromium and 0.5 parts by weight gold are introduced into a crucible which is placed in an oven and heated to melting in an inert atmosphere to form an alloy of said metals.

The resulting alloy is maintained at a temperature above its melting point for the admixing at the molten metal state with the reactive alloy. The molten alloy is maintained in an inert atmosphere throughout the process to prevent oxidation of the catalytic alloy at the elevated temperature.

FORMATION OF INTIMATE REACTIVE ALLOY AND CATALYTIC ALLOY SOLUTION

One and one-half parts by weight of reactive alloy is blended volumetrically with one part by weight of catalytic alloy in the molten liquid state said blending being carried out in an inert atmosphere.

After blending to provide a uniform solution of alloys, the resultant mixture may be cooled under the inert atmosphere in a suitable mold or other form adaptable for end use application.

FORMATION OF REACTOR BLOCK COMPRISING REACTIVE ALLOY, CATALYTIC ALLOY AND EXTENDER

The liquid reactive alloy and liquid catalytic alloy prepared above and a liquid extender are admixed in the following proportions:

21.293 parts by weight reactive alloy.
14.062 parts by weight catalytic alloy.
64.645 parts by weight tin.

The blending of the foregoing metallic compounds should be done in an inert atmosphere.

After blending, the resultant mixture is poured into a suitable mold conforming to a desired shape under an inert atmosphere and allowed to solidify under the inert atmosphere.

The entire foregoing procedure should be carried out under an inert atmosphere such as helium or argon and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.14 gallons of water per minute.

EXAMPLE II

PREPARATION OF REACTIVE ALLOY

A reactive alloy comprising 32.112 parts by weight of potassium and 37.688 parts by weight of aluminum is combined volumetrically at a temperature above the melting temperature of the highest melting point element in an inert atmosphere and in the state of agitation at the volumetric blending point.

The resulting reactive alloy is maintained in the molten state and its temperature is increased to a temperature above the melting temperature of the catalytic alloy for volumetric blending with the catalytic alloy and the extender if utilized.

PREPARATION OF CATALYTIC ALLOY 60.7 parts by weight bismuth, 0.8 parts by weight platinum, and 38.5 parts by weight germanium are introduced into a crucible which is placed in an oven and heated to melting in an inert atmosphere to form an alloy of said metals.

The resulting alloy is maintained at a temperature above its melting point for the admixing at the molten metal state with the reactive alloy. The molten alloy is maintained in an inert atmosphere throughout the process to prevent oxidation of the catalytic alloy at the elevated temperature.

FORMATION OF INTIMATE REACTIVE ALLOY AND CATALYTIC ALLOY SOLUTION

One and one-half parts by weight of reactive alloy is blended volumetrically with one part by weight of catalytic alloy in the molten liquid state said blending being carried out in an inert atmosphere.

After blending to provide a uniform solution of alloys, the resultant mixture may be cooled under the inert atmosphere in a suitable mold or other form adaptable for end use application.

FORMATION OF REACTOR BLOCK COMPRISING REACTIVE ALLOY, CATALYTIC ALLOY AND EXTENDER

The liquid reactive alloy and liquid catalytic alloy prepared above and a liquid extender are admixed in the following proportions:

30.400 parts by weight reactive alloy.
20.079 parts by weight catalytic alloy.
49.522 parts by weight tin.

The blending of the foregoing metallic compounds should be done in an inert atmosphere.

After blending, the resultant mixture is poured into a suitable mold conforming to a desired shape under an inert atmosphere and allowed to solidify under the inert atmosphere.

The entire foregoing procedure should be carried out under an inert atmosphere such as helium or argon and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.28 gallons of water per minute.

EXAMPLE III

PREPARATION OF REACTIVE ALLOY

A reactive alloy comprising 32.112 parts by weight of sodium and 37.688 parts by weight of aluminum is combined volumetrically at a temperature above the melting temperature of the highest melting point element in an inert atmosphere and in the state of agitation at the volumetric blending point.

The resulting reactive alloy is maintained in the molten state and its temperature is increased to a temperature above the melting temperature of the catalytic alloy for volumetric blending with the catalytic alloy and the extender if utilized.

PREPARATION OF CATALYTIC ALLOY 60.7 parts by weight bismuth, 0.5 parts by weight ruthenium and 38.5 parts by weight germanium are introduced into a crucible which is placed in an oven and heated to melting in an inert atmosphere to form an alloy of said metals.

The resulting alloy is maintained at a temperature above its melting point for the admixing at the molten metal state with the reactive alloy. The molten alloy is maintained in an inert atmosphere throughout the process to prevent oxidation of the catalytic alloy at the elevated temperature.

FORMATION OF INTIMATE REACTIVE ALLOY AND CATALYTIC ALLOY SOLUTION

One and one-half parts by weight of reactive alloy is blended volumetrically with one part by weight of catalytic alloy in the molten liquid state said blending being carried out in an inert atmosphere.

After blending to provide a uniform solution of alloys, the resultant mixture may be cooled under the inert atmosphere in a suitable mold or other form adaptable for end use application.

FORMATION OF REACTOR BLOCK COMPRISING REACTIVE ALLOY, CATALYTIC ALLOY AND EXTENDER

The liquid reactive alloy and liquid catalytic alloy prepared above and a liquid extender are admixed in the following proportions:
- 30.398 parts by weight reactive alloy.
- 20.138 parts by weight catalytic alloy.
- 49.464 parts by weight tin.

The blending of the foregoing compounds should be done in an inert atmosphere.

After blending, the resultant mixture is poured into a suitable mold conforming to a desired shape under an inert atmosphere and allowed to solidify under the inert atmosphere.

The entire foregoing procedure should be carried out under an inert atmosphere such as helium or argon and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.17 gallons of water per minute.

EXAMPLE IV

PREPARATION OF REACTIVE ALLOY

A reactive alloy comprising 18.391 parts by weight of sodium and 22.947 parts by weight of aluminum is combined volumetrically at a temperature above the melting temperature of the highest melting point element in an inert atmosphere and in the state of agitation at the volumetric blending point.

The resulting reactive alloy is maintained in the molten state and its temperature is increased to a temperature above the melting temperature of the catalytic alloy for volumetric blending with the catalytic alloy and the extender if utilized.

PREPARATION OF CATALYTIC ALLOY 63.064 parts by weight bismuth, 0.951 parts by weight osmium, 36.036 parts by weight antimony and 0.45 parts by weight germanium are introduced into a crucible which is placed in an oven and heated to melting in an inert atmosphere to form an alloy of said metals.

The resulting alloy is maintained at a temperature above its melting point for the admixing at the molten metal state with the reactive alloy. The molten alloy is maintained in an inert atmosphere throughout the process to prevent oxidation of the catalytic alloy at the elevated temperature.

FORMATION OF INTIMATE REACTIVE ALLOY AND CATALYTIC ALLOY SOLUTION

One and one-half parts by weight of reactive alloy is blended volumetrically with one part by weight of catalytic alloy in the molten liquid state said blending being carried out in an inert atmosphere.

After blending to provide a uniform solution of alloys, the resultant mixture may be cooled under the inert atmosphere in a suitable mold or other form adaptable for end use application.

FORMATION OF REACTOR BLOCK COMPRISING REACTIVE ALLOY, CATALYTIC ALLOY AND EXTENDER

The liquid reactive alloy and liquid catalytic alloy prepared above and a liquid extender are admixed in the following proportions:
- 18.003 parts by weight reactive alloy.
- 11.950 parts by weight catalytic alloy.
- 70.047 parts by weight 50 wt. % tin and 50 wt. % bismuth.

The blending of the foregoing metallic compounds should be done in an inert atmosphere.

After blending, the resultant mixture is poured into a suitable mold conforming to a desired shape under an inert atmosphere and allowed to solidify under the inert atmosphere.

The entire foregoing procedure should be carried out under an inert atmosphere such as helium or argon and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.21 gallons of water per minute.

EXAMPLE V

PREPARATION OF REACTIVE ALLOY

A reactive alloy comprising 32.112 parts by weight of cesium and 37.688 parts by weight of aluminum is combined volumetrically at a temperature above the melting temperature of the highest melting point element in an inert atmosphere and in the state of agitation at the volumetric blending point.

The resulting reactive alloy is maintained in the molten state and its temperature is increased to a temperature above the melting temperature of the catalytic alloy for volumetric blending with the catalytic alloy and the extender if utilized.

PREPARATION OF CATALYTIC ALLOY 60.7 parts by weight bismuth, 0.896 parts by weight palladium and 38.5 parts by weight germanium are introduced into a crucible which is placed in an oven and heated to melting in an inert atmosphere to form an alloy of said metals.

The resulting alloy is maintained at a temperature above its melting point for the admixing at the molten metal state with the reactive alloy. The molten alloy is maintained in an inert atmosphere throughout the process to prevent oxidation of the catalytic alloy at the elevated temperature.

FORMATION OF INTIMATE REACTIVE ALLOY AND CATALYTIC ALLOY SOLUTION

One and one-half parts by weight of reactive alloy is blended volumetrically with one part by weight of catalytic alloy in the molten liquid state said blending being carried out in an inert atmosphere.

After blending to provide a uniform solution of alloys, the resultant mixture may be cooled under the inert atmosphere in a suitable mold or other form adaptable for end use application.

FORMATION OF REACTOR BLOCK COMPRISING REACTIVE ALLOY, CATALYTIC ALLOY AND EXTENDER

The liquid reactive alloy and liquid catalytic alloy prepared above and a liquid extender are admixed in the following proportions:

30.398 parts by weight reactive alloy.
20.096 parts by weight catalytic alloy.
49.506 parts by weight tin.

The blending of the foregoing metallic compounds should be done in an inert atmosphere.

After blending, the resultant mixture is poured into a suitable mold conforming to a desired shape under an inert atmosphere and allowed to solidify under the inert atmosphere.

The entire foregoing procedure should be carried out under an inert atmosphere such as helium or argon and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.31 gallons of water per minute.

EXAMPLE VI

PREPARATION OF REACTIVE ALLOY

A reactive alloy comprising 35.144 parts by weight of sodium and 13.749 parts by weight of aluminum is combined volumetrically at a temperature above the melting temperature of the highest melting point element in an inert atmosphere and in the state of agitation at the volumetric blending point.

The resulting reactive alloy is maintained in the molten state and its temperature is increased to a temperature above the melting temperature of the catalytic alloy for volumetric blending with the catalytic alloy and the extender if utilized.

PREPARATION OF CATALYTIC ALLOY 53.7 parts by weight bismuth, 34.0 parts by weight antimony, 4.5 parts by weight nickel, 1.5 parts by weight gold, 5.4 parts by weight zirconium and 0.9 parts by weight chrominum are introduced into a crucible which is placed in an oven and heated to melting in an inert atmosphere to form an alloy of said metals.

The resulting alloy is maintained at a temperature above its melting point for the admixing at the molten metal state with the reactive alloy. The molten alloy is maintained in an inert atmosphere throughout the process to prevent oxidation of the catalytic alloy at the elevated temperature.

FORMATION OF INTIMATE REACTIVE ALLOY AND CATALYTIC ALLOY SOLUTION

One and one-half parts by weight of reactive alloy is blended volumetrically with one part by weight of catalytic alloy in the molten liquid state said blending being carried out in an inert atmosphere.

After blending to provide a uniform solution of alloys, the resultant mixture may be cooled under the inert atmosphere in a suitable mold or other form adaptable for end use application.

FORMATION OF REACTOR BLOCK COMPRISING REACTIVE ALLOY, CATALYTIC ALLOY AND EXTENDER

The liquid reactive alloy and liquid catalytic alloy prepared above and a liquid extender are admixed in the following proportions:

21.293 parts by weight reactive alloy.
14.064 parts by weight catalytic alloy.
64.643 parts by weight gallium The blending of the foregoing metallic compounds should be done in an inert atmosphere.

After blending, the resultant mixture is poured into a suitable mold conforming to a desired shape under an inert atmosphere and allowed to solidify under the inert atmosphere.

The entire foregoing procedure should be carried out under an inert atmosphere such as helium or argon and in the absence of contaminants. Oxidation of the metallic components and/or hydroxide formation will "poison" the resulting reactor block and reduce the activity thereof. Moreover, during the steps of the process operated at elevated temperature, the presence of any oxygen will cause the mass to ignite.

The reactor blocks are contacted with a fine spray of water at about room temperature in an atmospheric environment. The gaseous effluent from said contact comprises hydrogen and oxygen and burns when subjected to electrical sparking. The volume of gas evolved is dependent on reactor block surface area and the volume of water impinging thereon. Generally a 2.5 square cm surface will react with 0.10 gallons of water per minute.

Although the invention has been described in detail with respect to specific examples, it will be appreciated that various changes and modifications can be made by those skilled in the art within the scope of the invention as expressed in the following claims.

The invention having been described, what is claimed is:

1. A material for the generation of hydrogen and oxygen from water which comprises a reactive alloy of an alkali metal and aluminum wherein the atomic ratio of alkali metal to aluminum is from about 1:3 to about 3:1, the reactive alloy being combined with a catalytic alloy of a metal selected from the platinum metals family or nickel and at least one element selected from the group consisting of germanium, antimony, gallium, thallium, indium and bismuth.

2. The material of claim 1 further characterized in that the alkali metal is sodium or potassium.

3. The material of claim 1 further characterized in that the catalytic alloy contains antimony.

4. The material of claim 1 further characterized in that the catalytic alloy contains germanium.

5. The material of claim 1 further characterized in that the catalytic alloy also contains a metal selected from the group consisting of zirconium, chromium and mixtures thereof.

6. The material of claim 1 further characterized in that the catalytic alloy also contains a metal selected from the group consisting of bismuth, gold and mixtures thereof.

7. The material of claim 1 further comprising tin.

8. The material of claim 1 further characterized in that the ratio, by weight, of catalytic alloy to reactive alloy is from about 1:1 to about 1:5.

9. The material of claim 8 further characterized in that the ratio, by weight, of catalytic alloy to reactive alloy is about 1:1 to about 1:3.

10. The material of claim 5 further characterized in that the catalytic alloy contains from about 0.7% to about 1.1% by weight chromium.

11. The material of claim 1 further characterized in that each of the metallic components of the catalytic alloy present in said material is present in an amount of from about 0.4 to about 28.5 weight percent based upon the weight of catalytic alloy and reactive alloy combined.

12. The material of claim 1 further characterized in that said catalytic alloy comprises a metal selected from the platinum metal family present in an amount of from about 0.4 to about 2.3% by weight, bismuth present in an amount of from about 42.9 to about 71.5% by weight, antimony present in an amount of from about 25.5 to about 42.5% by weight, chromium present in an amount of from about 0.7 to about 1.1% by weight, zirconium present in an amount of from about 4.1 to about 6.8% by weight and gold present in an amount of from about 0.6 to about 2.3% by weight.

13. The material of claim 12 further characterized in that said catalytic alloy comprises about 1.4 wt % of platinum, about 57.3 wt. % bismuth, about 34.0 wt. % antimony, about 0.9 wt. % chromium, about 5.4 wt. % zirconium and about 1.0 wt. % gold.

14. A process for the generation of hydrogen and oxygen from water which comprises contacting water with a material comprising a reactive alloy of an alkali metal and aluminum wherein the atomic weight ratio of alkali metal to aluminum is from about 1:3 to about 3:1, the reactive alloy being combined with a catalytic alloy containing a metal selected from the platinum metal family or nickel and at least one metal selected from the group consisting of germanium, antimony, gallium, thallium, indium and bismuth.

15. The process of claim 14 further characterized in that the alkali metal is sodium, potassium or mixtures thereof.

16. The process of claim 14 further characterized in that the catalytic alloy comprises at least one metal selected from the group consisting of germanium, antimony, gallium, thallium, indium and bismuth and the alkali metal is sodium. metal is sodium.

17. The process of claim 16 further characterized in that the catalytic alloy contains antimony.

18. The process of claim 16 further characterized in that the catalytic alloy contains germanium.

19. The process of claim 16 further characterized in that the catalytic alloy also contains a metal selected from the group consisting of zirconium, chromium and mixtures thereof.

20. The process of claim 16 further characterized in that the catalytic alloy also contains a metal selected from the group consisting of bismuth, gold and mixtures thereof.

21. The process of claim 16 further characterized in that the catalytic alloy also contains tin.

22. The process of claim 16 further characterized in that the ratio, by weight of catalytic alloy to reactive alloy is from about 1:1 to about 1:5.

23. The process of claim 22 further characterized in that the ratio, by weight, of catalytic alloy to reactive alloy is about 1:1 to about 1:3.

24. The process of claim 19 further characterized in that the catalytic alloy contains from about 0.7% to about 1.1% by weight chromium.

25. The process of claim 16 further characterized in that each of the metallic components of the catalytic alloy present in said material is present in an amount of from about 0.4 to about 28.5 weight percent based upon the weight of catalytic alloy and reactive alloy combined.

26. The process of claim 14 further characterized in that said catalytic alloy comprises a metal selected from the platinum metal family present in an amount of from about 0.4 to about 2.3% by weight, bismuth present in an amount of from about 42.9 to about 71.5% by weight, antimony present in an amount of from about 25.5 to about 42.5% by weight, chromium present in an amount of from about 0.7 to about 1.1% by weight, zirconium present in an amount of from about 4.1 to about 6.8% by weight and gold present in an amount of from about 0.6 to about 2.3% by weight.

27. The process of claim 26 further characterized in that said catalytic alloy comprises about 1.4 wt % of platinum, 57.3 wt. % bismuth, about 34.0 wt. % antimony, about 0.9 wt. % chromium, about 5.4 wt. % zirconium and about 1.0 wt. % gold.

* * * * *